US012559349B2

(12) United States Patent
Krambeck et al.

(10) Patent No.: US 12,559,349 B2
(45) Date of Patent: Feb. 24, 2026

(54) ELEVATOR SAFETY SYSTEMS WITH LANDING DOOR MONITORING

(71) Applicant: Otis Elevator Company, Farmington, CT (US)

(72) Inventors: Helge Krambeck, Berlin (DE); Peter Herkel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1498 days.

(21) Appl. No.: 16/952,410

(22) Filed: Nov. 19, 2020

(65) Prior Publication Data

US 2021/0276823 A1 Sep. 9, 2021

(30) Foreign Application Priority Data

Mar. 9, 2020 (EP) .................................... 20161828

(51) Int. Cl.
*B66B 5/00* (2006.01)
*B66B 1/32* (2006.01)
(Continued)

(52) U.S. Cl.
CPC .............. *B66B 5/0031* (2013.01); *B66B 1/32* (2013.01); *B66B 1/3492* (2013.01); *B66B 1/36* (2013.01);
(Continued)

(58) Field of Classification Search
CPC ........... B66B 1/32; B66B 1/3492; B66B 1/36; B66B 5/0031; B66B 5/02
See application file for complete search history.

(56) References Cited

U.S. PATENT DOCUMENTS

2008/0087502 A1* 4/2008 Zapf ....................... B66B 7/062 187/394
2012/0073909 A1* 3/2012 Kondo ...................... B66B 1/32 187/247
(Continued)

FOREIGN PATENT DOCUMENTS

DE 112015006825 T5 5/2018
EP 2583928 A1 4/2013
(Continued)

OTHER PUBLICATIONS

European Search Report for application EP 20161828.7, dated Oct. 6, 2020, 91 pages.

*Primary Examiner* — Laert Dounis
(74) *Attorney, Agent, or Firm* — CANTOR COLBURN LLP

(57) ABSTRACT

An safety system (40) including: a plurality of landing door sensors (26), each landing door sensor (26) being configured to provide a warning signal (52) when a respective landing door (22) is open; at least one position sensor (14) configured to determine a current position (54) of an elevator car (10) moving within a hoistway (2); an elevator brake (7) configured to halt the motion of the elevator car (10); and a controller (8) configured to send an emergency stop signal (58) to the elevator brake (7). The controller (8) is configured to determine whether to send the emergency stop signal (58) based on: a direction of travel of the elevator car (10) with respect to the open landing door (22); a current speed of the elevator car (10); and a distance (D) between the open landing door (22) and the current position of the elevator car (10).

13 Claims, 7 Drawing Sheets

(51) Int. Cl.

| | |
|---|---|
| ***B66B 1/34*** | (2006.01) |
| ***B66B 1/36*** | (2006.01) |
| ***B66B 3/00*** | (2006.01) |
| ***B66B 5/02*** | (2006.01) |
| ***B66B 9/00*** | (2006.01) |
| ***B66B 13/22*** | (2006.01) |

(52) U.S. Cl.
CPC ................ *B66B 3/002* (2013.01); *B66B 5/02* (2013.01); *B66B 9/00* (2013.01); *B66B 13/22* (2013.01)

(56) References Cited

U.S. PATENT DOCUMENTS

2018/0162692 A1* 6/2018 Herkel ...................... B66B 1/36
2018/0237261 A1* 8/2018 Herkel .................. B66B 5/0031

FOREIGN PATENT DOCUMENTS

WO 03020627 A1 3/2003
WO WO-2021037912 A1 * 3/2021 ............. B66B 1/285

* cited by examiner

ELEVATOR SAFETY SYSTEMS WITH LANDING DOOR MONITORING

This application claims priority to European Patent Application No. 20161828.7, filed Mar. 9, 2020, and all the benefits accruing therefrom under 35 U.S.C. § 119, the contents of which in its entirety are herein incorporated by reference.

TECHNICAL FIELD

This disclosure relates to elevator safety systems, and to methods of operating elevator safety systems.

BACKGROUND

Elevator systems comprise at least one hoistway in which an elevator car travels between landings to transport passengers. Each landing is provided with one or more landing doors which open when the elevator car is in position to allow the passengers to enter the elevator car through a car door. Elevator systems generally include one or more elevator safety systems which monitor for unsafe conditions and implement an appropriate emergency procedure when an unsafe condition occurs.

During normal operation of an elevator system, whilst an elevator car is in motion within a hoistway, all landing doors should remain closed to avoid risk of injury to any people, for example, passengers waiting on the landings, passengers travelling in the elevator car and maintenance operators. Landing doors should also remain closed to avoid damage to components of the elevator system.

Elevator safety systems are known which monitor landing doors within a hoistway. When a landing door is opened within the hoistway whilst an elevator car is in motion in the hoistway, the open landing door is detected and an emergency stop of the elevator car is implemented. In some circumstances the elevator car may stop after it has passed the open landing door.

Elevator systems include landing door opening mechanisms Sensors can be provided which give an indication as to whether the landing door is open, for example electrical contacts may be provided on the landing door opening mechanism which give an indication that the landing door is open. Over time, the mechanical and or electrical components of the landing door opening mechanisms can become worn to the point of malfunction. For example, a damaged and/or worn landing door opening mechanism can be inadvertently triggered by an impact from a passing elevator car for example, an elevator door mechanism, and this can cause the landing door to open. Generally, in this situation, the landing door opens slightly, and is then closed again after the elevator car has passed because the landing door mechanism is configured to close under the effects of gravity. However, the opening of the landing door under these circumstances may still be detected by the elevator safety system which will then implement an emergency stop.

SUMMARY

According to a first aspect of the present disclosure there is provided an elevator safety system comprising: a plurality of landing door sensors, each landing door sensor being configured to provide a warning signal when a respective landing door is open; at least one sensor configured to determine a current position of an elevator car moving within a hoistway; an elevator brake configured to halt the motion of the elevator car; a controller configured to send an emergency stop signal to the elevator brake; wherein the controller is further configured to determine whether to send the emergency stop signal based on: a direction of travel of the elevator car with respect to the open landing door; a current speed of the elevator car; and a distance between the open landing door and the current position of the elevator car.

The elevator safety system is able to continually monitor the elevator system and determine whether it is appropriate to carry out an emergency stop. Therefore, unnecessary emergency stops of the elevator system are avoided. In order to determine whether it is appropriate to carry out an emergency stop, the speed and direction of travel of the elevator car are monitored and evaluated with respect to a distance between the current position of the elevator car and the open landing door.

The sensor may be a position sensor. The sensor may be an absolute position reference sensor. The sensor may be a speed sensor, and the controller may be configured to determine the current position using data from the speed sensor. The sensor may be an acceleration sensor, and the controller may be configured to determine the current position using data from the acceleration sensor.

The sensor may be configured for wireless communication with the controller. The elevator system may include control lines between the sensor and the controller.

The at least one sensor may be a position sensor and the controller may be configured to determine the current speed of the elevator car by differentiating data from the position sensor.

The elevator safety system may comprise a speed sensor. The elevator safety system may comprise a second sensor configured to measure the current speed of the elevator car.

The warning signal may include data relating to the location of the open landing door.

The controller may be configured to determine whether the elevator car is moving towards or away from the open landing door.

The controller may be configured to determine to send the emergency stop signal when the elevator car is moving towards the open landing door and the elevator car can be safely stopped before or at the open landing door. The controller may be configured to determine to send the emergency stop signal when the elevator car is moving towards the open landing door and the elevator car is travelling below a lower threshold speed. The controller may be configured to determine not to send the emergency stop signal when the elevator car is moving towards the open landing door and the elevator car cannot be safely stopped before or at the open landing door, i.e. the elevator car is travelling too fast to stop in time.

The controller may be configured to determine a current emergency stopping distance based on the current speed of the elevator car and direction of travel with respect to the open landing door. The controller may be configured to send the emergency stop signal when the distance to the open landing door is less than the current emergency stopping distance. The controller may be configured to not send the emergency stop signal when the distance to the open landing door is greater than the current emergency stopping distance.

The controller may be configured to determine a direction of travel of the elevator car with respect to the open landing door. The controller may be configured to determine whether the elevator car is moving towards or away from the open landing door. If it is determined that the elevator car is moving away from the door, the controller may determine not to send the emergency stop signal.

The controller may be configured to determine the direction of travel of the elevator car using data from the sensor. The sensor may be a position sensor, and the controller may be configured to determine the direction of travel of the elevator car using data from the position sensor. The sensor may be a speed sensor. The controller may be configured to determine the direction of travel of the elevator car using data from the speed sensor.

The sensor may comprise an acceleration sensor. The acceleration sensor may be configured to determine a current acceleration of the elevator car. The controller may be configured to determine a direction of travel of the elevator car using data from the acceleration sensor. The controller may be configured to determine the current speed of the elevator car using data from the acceleration sensor. The controller may be configured to determine the current position of the elevator car using data from the acceleration sensor.

The controller may be configured to check the data from the landing door sensor at a predetermined time after receipt of the warning signal. The controller may be configured to send the emergency stop signal only if the landing door is still open at the predetermined time. The controller may be configured to cancel the emergency stop signal if the landing door is has closed at the predetermined time.

The controller may be configured to receive an input indicating that maintenance is being carried out on the elevator system. The controller may be configured to determine that a landing door close to the elevator car is open; send an emergency stop signal when the current speed of the elevator car is below a predetermined maintenance limit, and determine not to send the emergency stop signal when the current speed of the elevator car exceeds the predetermined maintenance limit.

The input indicating that maintenance is being carried out may be provided by a maintenance control unit. The controller may determine that maintenance is being carried out based on current and/or recent movement of the elevator car.

According to a further aspect, there is provided an elevator system comprising a hoistway extending between a plurality of landings each having at least one landing door; an elevator car configured for moving along the hoistway between the plurality of landings; and an elevator safety system as described above.

The controller may be configured not to send the emergency stop signal when the elevator car is travelling above a predetermined threshold speed. The elevator system may be a high speed elevator system with a high speed elevator car. The controller may be configured not to send the emergency stop signal when the high speed elevator car is travelling above a predetermined threshold.

According to a further aspect, there is provided a method for operating an elevator safety system comprising: monitoring a current position of an elevator car moving within a hoistway; detecting an open landing door within the hoistway; determining the distance between the current position of the elevator car and the open landing door; determining whether to send an emergency stop signal based on: a direction of travel of the elevator car with respect to the open landing door; a current speed of the elevator car and the distance between the open landing door and the current position of the elevator car.

The method may include a step of evaluating a current speed of the elevator car. The method may include receiving data relating to the current position from a position sensor provided on an elevator car.

The method may comprise receiving a speed signal from a speed sensor provided on the elevator car. The method may comprise a step of determining the current speed of the elevator car by differentiating the data relating to the current position of the elevator car. The method may include a step of determining the current speed of the elevator car by differentiating data from at least one position sensor provided on the elevator car.

The controller may be configured to determine a direction of travel of the elevator car. The determined direction of travel of the elevator car may be used in the determination of whether to send the emergency stop signal.

The method may comprise determining to send the emergency stop signal when the elevator car is moving towards the open landing door and the elevator car can be safely stopped before or at the open landing door.

The method may comprise determining to send the emergency stop signal when the elevator car is moving towards the open landing door and the elevator car can be safely stopped before or at the open landing door. The method may comprise determining to send the emergency stop signal when the elevator car is moving towards the open landing door and the elevator car is travelling below a lower threshold speed. The method may comprise determining not to send the emergency stop signal when the elevator car is moving towards the open landing door. The method may include determining not to send the emergency stop signal when the elevator car is travelling above a predetermined threshold speed.

The method may comprise determining a current emergency stopping distance based on the current speed of the elevator car. The method may comprise sending the emergency stop signal when the distance is less than the current emergency stopping distance. The method may comprise not sending the emergency stop signal when the distance is greater than the current emergency stopping distance.

The method may comprise determining if the elevator car is travelling towards or away from the open landing door. The determined direction of travel of the elevator car may be used in the determination of whether to send the emergency stop signal.

The method may comprise checking the data from the landing door sensor at a predetermined time after receipt of the warning signal. The method may comprise sending the emergency stop signal only if the landing door is still open at the predetermined time. The method may comprise cancelling the emergency stop signal if the landing door is has closed at the predetermined time.

The method may comprise receiving an input indicating that maintenance is being carried out on the elevator system. The step of determining whether to send the emergency stop signal may include determining that a landing door close to the elevator car is open; sending an emergency stop signal when the current speed of the elevator car is below a predetermined maintenance limit. The step of determining whether to send the emergency stop signal may include determining not to send the emergency stop signal when the current speed of the elevator car exceeds a predetermined maintenance limit.

The method may include detecting the presence of one or more passengers in the elevator car. The method may include defining a reduced emergency stop distance in the case where no passengers are present in the elevator car.

The elevator safety system and method described above use the speed and direction of travel of the elevator car and the location of the open landing door relative to the elevator car to evaluate whether it is appropriate to apply the emergency brake. The elevator safety system and method described above are able to provide continuous monitoring of the hoistway landing doors and determine with respect to the current motion of the escalator car whether it is appropriate to carry out an emergency stop.

DRAWING DESCRIPTION

Certain examples of the present disclosure will now be described with reference to the accompanying drawings in which.

Figure 7:
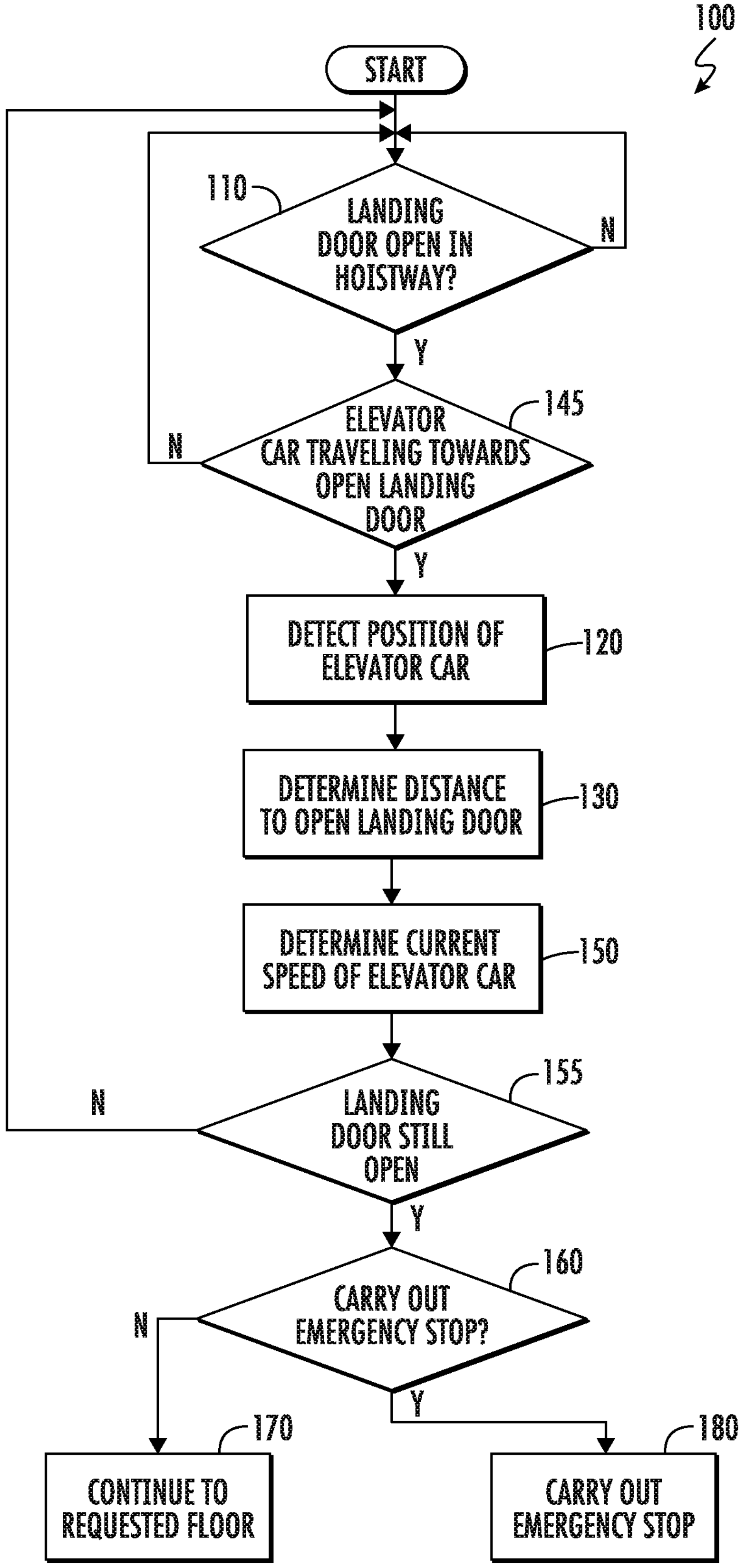
Figure 8:
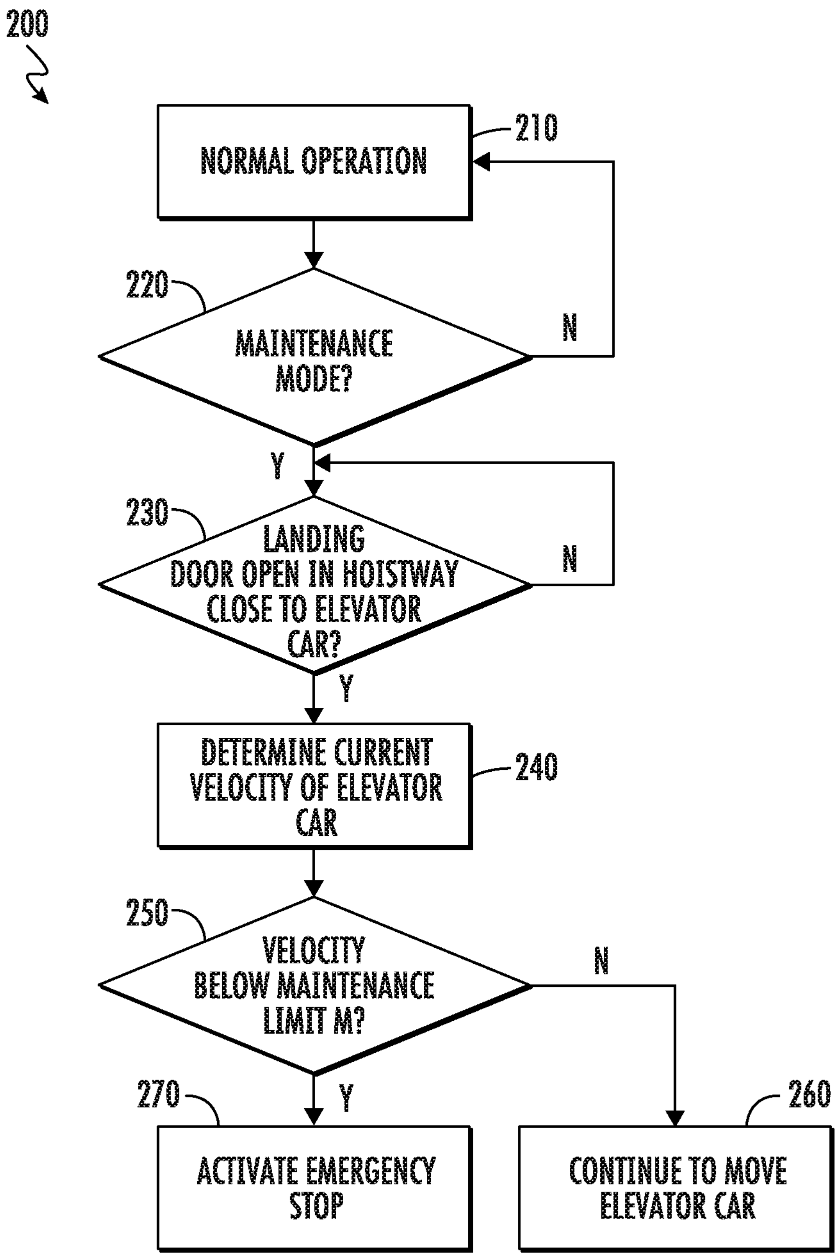

FIGS. 5*a*, 5*b*, 6*a* and 6*b* show schematic representations of steps for determining whether to activate the emergency stop according to examples of the present disclosure;

FIG. 7 shows a method for operating an elevator safety system according to another example of the present disclosure; and FIG. 8 shows a schematic representation of a maintenance mode of an elevator system according to an example of the present disclosure.

DETAILED DESCRIPTION

Figure 1:
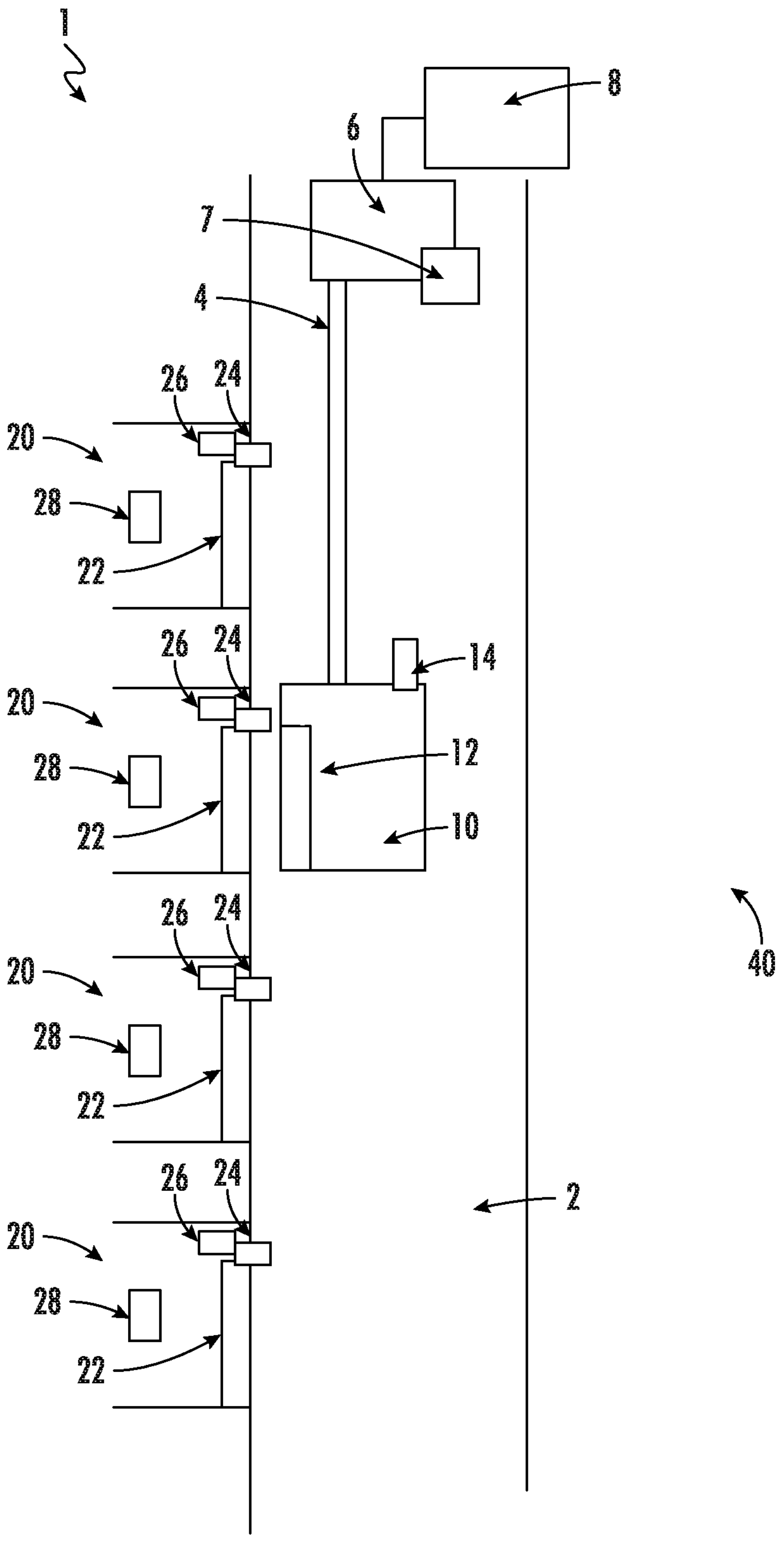
FIG. 1 shows an elevator system according to an example of the present disclosure.

FIG. 1 shows an elevator system 1 comprising a hoistway 2 and an elevator car 10 which travels within the hoistway 2. The elevator car 10 is moveably suspended by a tension member 4, for example a rope or belt. The tension member 4 is connected to an elevator drive unit 6 which is configured to drive the tension member 4 in order to move the elevator car 10. The elevator drive unit 6 may be any type of commonly used drive, such as but not limited to, a traction drive. The elevator system 1 also includes a controller 8.

In other examples (not shown), the elevator system 1 includes an elevator drive unit 6 which operates without a tension member 4, such as for example a hydraulic drive or a linear drive. In other examples (not shown), the elevator system 1 also includes a counterweight which moves concurrently and in an opposite direction to the elevator car 10.

An elevator brake 7 is configured for braking the movement of the elevator car 10. In FIG. 1, the elevator brake 7 is schematically shown with the elevator drive unit 6. It will be appreciated that this represents a location adjacent to or integral with the elevator drive unit 6.

The elevator car 10 travels between a plurality of landings 20 which are normally located on different floors of a building. FIG. 1 shows four landings 20 within a hoistway 2 (or section of hoistway 2). However, it will be appreciated that the elevator system 1 may include any number of landings 20.

Each landing 20 is provided with a landing door 22, and the elevator car 10 includes an elevator door 12 for allowing passengers to move between the elevator car 10 and one of the landings 20. A landing door opening mechanism 24 is provided for opening and closing each landing door 22, and a landing door sensor 26 detects when a respective landing door 22 is open. The landing door sensors 26 are configured to communicate, for example wirelessly, with the controller 8. A control panel 28 is provided at each landing 20.

The elevator car 10 includes a sensor 14, which is configured to determine a current position of the elevator car 10. The sensor 14 is configured to communicate with the controller 8. The sensor 14 may be configured to wirelessly communicate with the controller 8.

The sensor 14 may be any suitable sensor which can provide data which can be used to determine the current position of the elevator car 10, for example a position sensor, a speed sensor or an acceleration sensor. For example, the sensor may be a position sensor, such as, but not limited to, discrete vanes, encoders on elevator components (machine or governor), or absolute position reference system (optical or magnetic). Data from the position sensor 14 is transmitted to the controller 8 which determines a current speed of the elevator car 10 by differentiating the positional information provided by the position sensor 14.

Alternatively, the sensor 14 may be a speed sensor or an acceleration sensor and the controller 8 may be configured to determine the current position and the current speed of the elevator car 10 from data received from the speed/acceleration sensor 14.

In this example, the controller 8 is depicted as being located at an upper portion of the hoistway 2. However, it will be appreciated that the controller 8 may be provided at any convenient location on or near the elevator system 1.

The controller 8 can be configured to electronically communicate with the sensors 14, 16, 26 via a network interface device. The network interface device includes any communication device (e.g., a modem, wireless network adapter, etc.) that operates according to a network protocol (e.g., Wi-Fi, Ethernet, satellite, cable communications, etc.) which establishes a wired and/or wireless communication.

The elevator system 1 of FIG. 1 includes an elevator safety system 40 which comprises: the sensor 14, the controller 8, the brake 7 and the landing door sensors 26. The operation of the elevator safety system 40 will be explained below.

Figure 2:
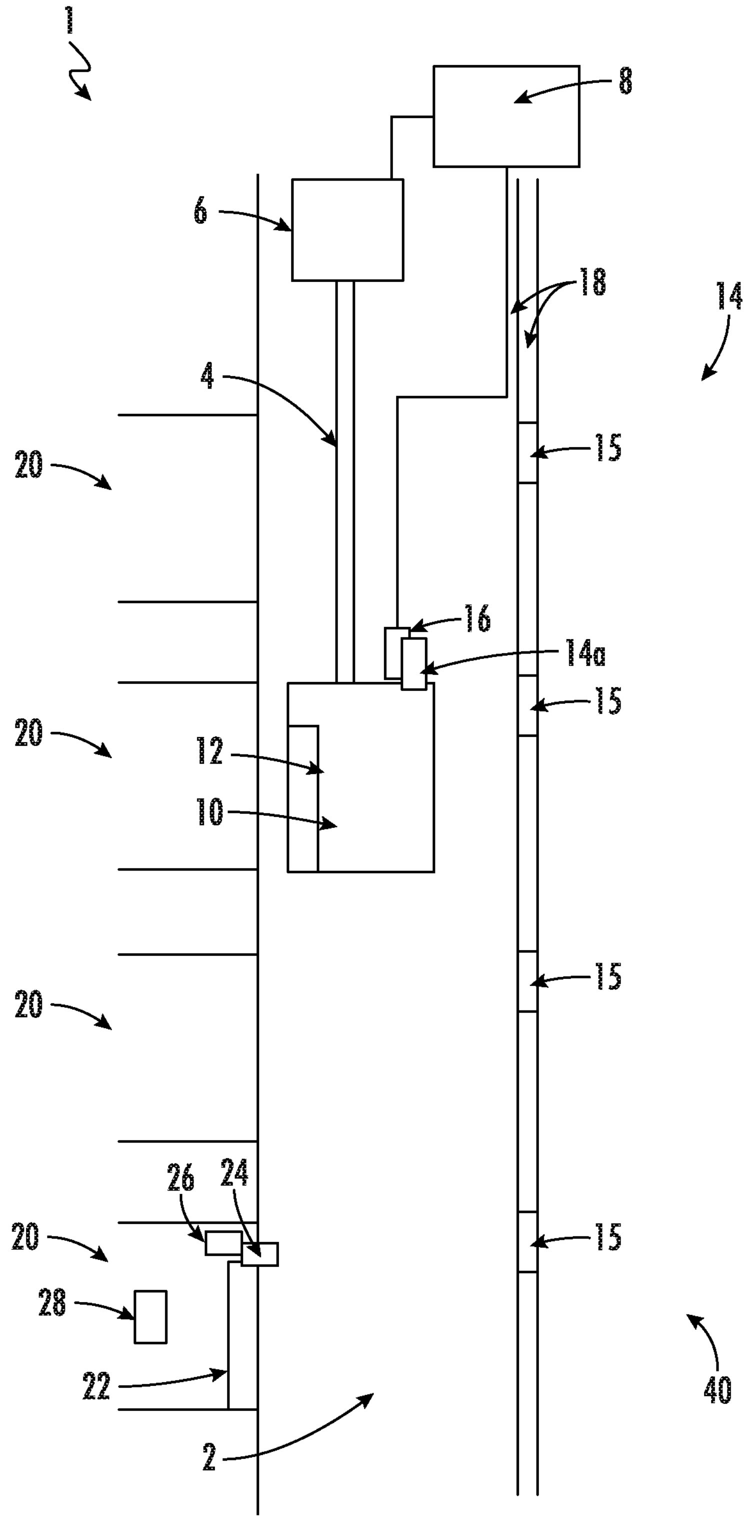
FIG. 2 shows an elevator system according to another example of the present disclosure.

FIG. 2 shows an elevator system 1 according to another example of the present disclosure. In this figure, components have the same references as described above with respect to FIG. 1. In FIG. 2, four landings 20 are depicted, but for ease of understanding not all of the features of the landings 20 are shown.

In the example of FIG. 2, the sensor 14 is an absolute position reference sensor including an elevator car component 14*a*, which is mounted on the elevator car 10, and a plurality of hoistway components 15, which in this example are mounted on a wall of the hoistway 2. The elevator car component 14*a* is configured to interact with the hoistway components 15 to determine a current position of the elevator car 10. In this example, the components of the absolute position reference sensor 14 communicate with the controller 8 via control lines 18.

The hoistway components 15 may be configured to mechanically, optically and/or magnetically communicate with the elevator car component 14*a*. In another example (not shown) the hoistway components 15 may be provided as a coded tape extending along a complete travel path of the elevator car 10.

In the example of FIG. 2, the elevator car 10 also includes a speed sensor 16 which is configured to determine a current speed of the elevator car 10. The speed sensor 16 may be formed integrally with the position sensor 14, or the two sensors 14, 16 may be separate components. In FIG. 2, the speed sensor 16 communicates with the controller 8 via a control line 18.

It will be appreciated that instead of the control lines 18, the sensor components 14*a*, 15, 16 could be configured for wireless communication with the controller 8.

In another example (not shown), the speed sensor 16 may be provided at the elevator drive unit 6 configured to detect the speed of the tension member 4 at the elevator drive unit 6.

The elevator system 1 of FIG. 2 includes an elevator safety system 40 which comprises: the absolute position reference sensor 14 (comprising the elevator car component 14*a* and the hoistway components 15), the speed sensor 16, the controller 8, the brake 7 and the landing door sensors 26.

Figure 3:
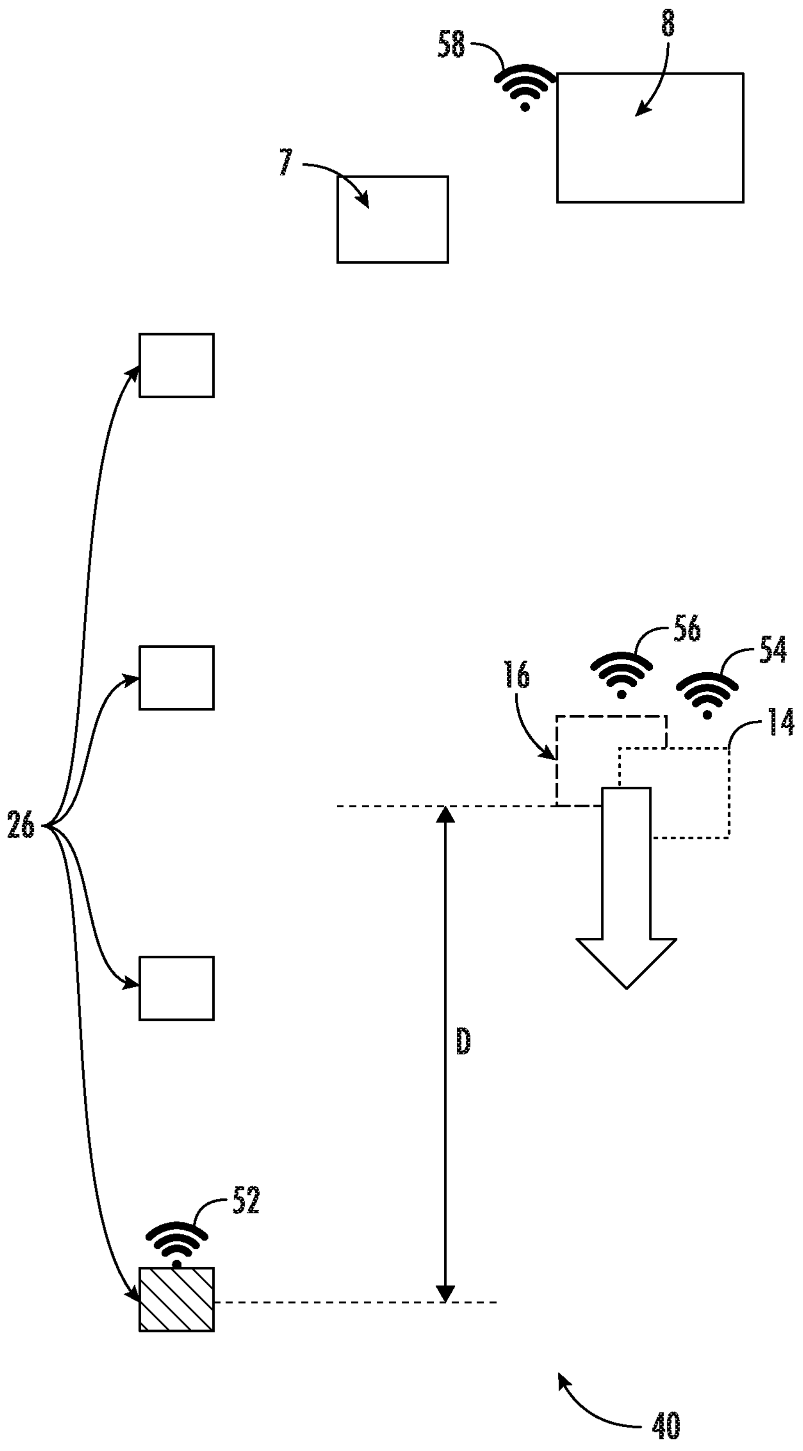
FIG. 3 shows an elevator safety system according to an example of the present disclosure.

FIG. 3 shows a schematic representation of the elevator safety system 40 of FIGS. 1 and 2, comprising the sensor 14, the controller 8, the elevator brake 7 and the landing door sensors 26. The speed sensor 16, which is provided in the elevator system 40 of FIG. 2 only, is shown with dashed lines.

The sensor 14 transmits a signal 54 to the controller 8. The speed sensor 16 (if provided) transmits a signal 56 to the controller 8.

When one landing door sensor 26 (indicated with shading) detects that the respective landing door 22 is open, it generates a warning signal 52 which is transmitted to the controller 8. The location of each landing door sensor 26 is known. Therefore, the warning signal 52 includes data relating to a location of the open landing door 22. The controller 8 can then determine a distance D between the elevator car 10 and the open landing door 22.

The sensor 14 and speed sensor 16 (where provided) may constantly transmit data to the controller 8. Alternatively, the sensor 14 and speed sensor 16 (where provided) may be configured to transmit data to the controller 8 only when a warning signal is generated by a landing door sensor 26.

The controller 8 is configured to send an emergency stop signal 58 to the elevator brake 7.

Figure 4:
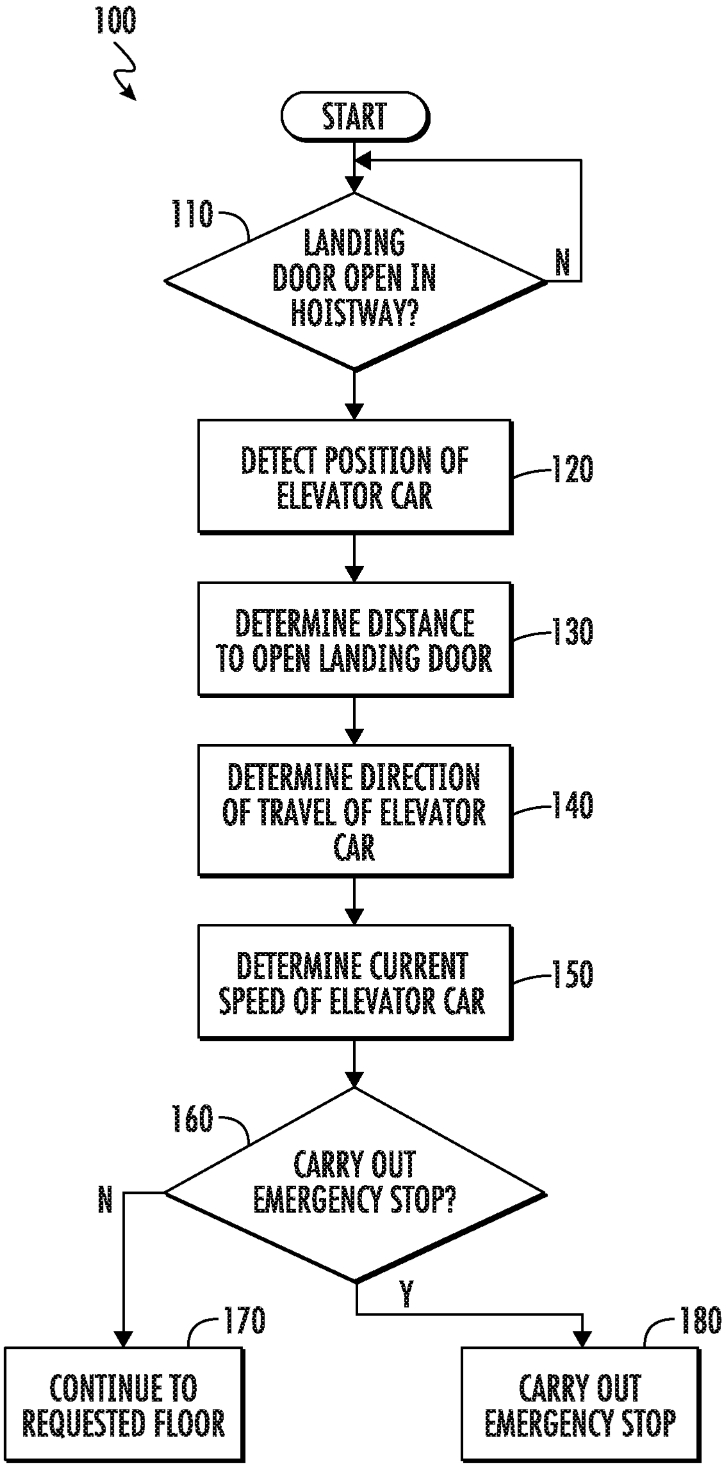
FIG. 4 shows a method for operating an elevator safety system according to an example of the present disclosure.

A method 100 of operating the elevator safety system 40 is schematically represented in FIG. 4.

In step 110, the landing door sensors 26 monitor the state of respective landing doors 22. When a landing door sensor 26 detects that a landing door 22 is open, it outputs the warning signal 52, indicating the open landing door 22 and its location. In step 120, a current position of the elevator car 10 is provided by the sensor 14, or calculated by the controller 8 using data from the sensor 14. In step 130, the controller 8 determines a distance D between the current position of the elevator car 10 and the location of the open landing door 22. In step 140, the controller 8 determines a direction of travel of the elevator car 10 with respect to the open landing door 22, i.e. is the elevator car 10 moving towards or away from the open landing door 22. In step 150, the controller 8 determines a current speed of the elevator car 10, using the data from the speed sensor 16 (where provided) or calculated from the sensor 14.

In step 160, the controller 8 then determines whether to operate the elevator brake 7 to carry out an emergency stop. The determination of whether to carry out an emergency stop is based on whether it is safe and/or appropriate to carry an emergency stop.

The determination as to whether to carry out an emergency stop is based on the direction of travel of the elevator car 10; the current speed of the elevator car 10 and the distance between the elevator car 10 and the open landing door 22. The determination may be carried out in several ways, as outlined below.

Figure 5A:
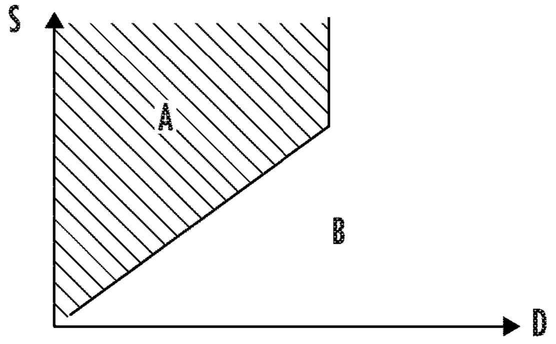

FIG. 5*a* shows a schematic representation of a first example of the determination step 160 when the elevator car 10 is moving towards the open landing door 22. The current speed of the elevator car 10 is represented on the vertical axis, and the distance D between the elevator car 10 and the open landing door 22 is represented on the horizontal axis. Two zones are defined. Zone A represents the situation when the elevator car 10 is moving towards the open landing door 22, but is moving too fast to stop before it reaches the open landing door 22. In this case, it is determined that it is not appropriate to carry out an emergency stop. Zone B represents the situation when the elevator car 10 is moving towards the open landing door 22, and it is travelling slow enough and/or is far enough away from the open landing door 22 that the elevator car 10 can be safely stopped at or before reaching the open landing door 22. In this case, it is determined that it is appropriate to carry out an emergency stop.

Figure 5B:
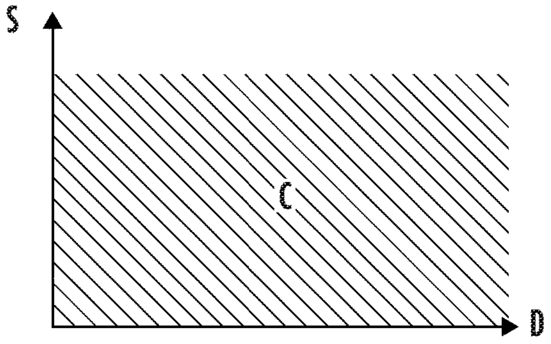

FIG. 5*b* shows a schematic representation of a first example of the determination step 160 when the elevator car 10 is moving away from the open landing door 22. Zone C represents the situation when the elevator car 10 is moving away from the open landing door 22. In this case, it is determined that it is not appropriate to carry out an emergency stop.

Figure 6A:
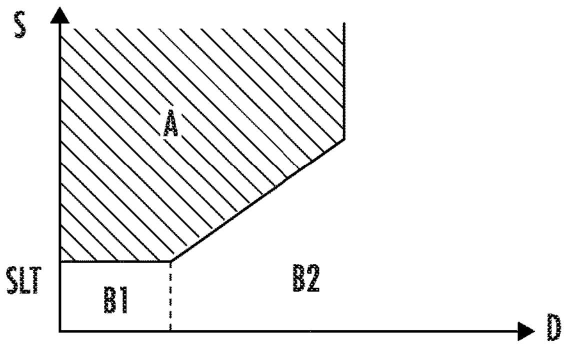

FIG. 6*a* shows a schematic representation of a second example of the determination step 160 when the elevator car 10 is moving towards the open landing door 22. Zone A represents the situation where the elevator car 10 is moving towards the open landing door 22 at a speed above a lower threshold SLT, and it is moving too fast to stop before it reaches the open landing door 22. In this case, it is determined that it is not appropriate to carry out an emergency stop. Zone B1 represents the situation when the elevator car 10 is towards the open landing door 22 at a low speed (below the lower threshold SLT) and close to the open landing door. In this case, the elevator car 10 can be safely stopped at or before reaching the open landing door 22 and so it is determined that it is appropriate to carry out an emergency stop. Zone B2 represents the situation when the elevator car 10 is towards the open landing door 22 and it is travelling slow enough and/or is far enough away from the open landing door 22 that the elevator car 10 can be safely stopped at or before reaching the open landing door 22. In this case, it is determined that it is appropriate to carry out an emergency stop.

Figure 6B:
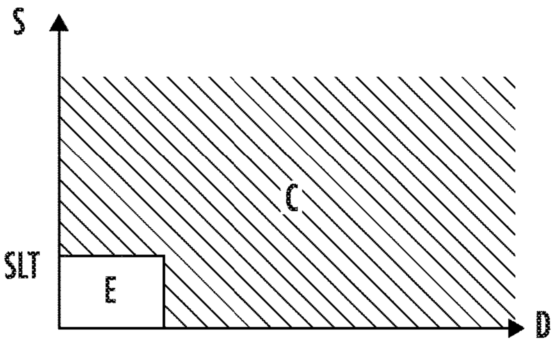

FIG. 6*b* shows a schematic representation of a second example of the determination step 160 when the elevator car 10 is moving away from the open landing door 22. Zone E represents the situation when the elevator car 10 is moving away from the open landing door 22 at a low speed and close to the open landing door 22. In this case, the elevator car 10 can be safely stopped in the vicinity of the open landing door 22 and so it is determined that it is appropriate to carry out an emergency stop. Zone C represents other situations when the elevator car 10 is moving away from the open landing door 22, and in this case, it is determined that it is not appropriate to carry out an emergency stop.

Alternatively or additionally, the determination as to whether to carry out an emergency stop can be made using emergency stopping distances. Emergency stopping distances E for given speeds of the elevator car 10 are predefined. Therefore, the controller 8 can determine a current emergency stopping distance E based on the current speed.

The distance D can be compared to the current emergency stopping distance E. If the current emergency stopping distance E is greater that the distance D, it is not possible to stop the elevator car 10 in time. Therefore, the controller 8 determines that it is not appropriate to carry out an emergency stop because the elevator car 10 would pass the open landing door 22 before it stops.

When no emergency stop instruction is given and the elevator car 10 continues to move in accordance with its previous instruction (step 170). If a destination has already been set, for example by a passenger in the elevator car 10 or a passenger on a landing 20 who has made an elevator call request, the elevator car 10 travels to the requested landing 20. If no destination has been set, the elevator car 10 moves to a location in accordance with any predetermined logic, for example the controller 8 may return an empty elevator car 10 to a predetermined landing 20, for example the ground floor.

When it is determined to be appropriate to apply the emergency brake, the controller 8 sends an emergency stop signal 58 to the elevator brake 7 (step 180) and the elevator brake 7 is activated to halt the elevator car 10.

Optionally, step 160 further comprises determining whether it is possible to stop the elevator car 10 at a landing 20 before the detected open landing door 22. In other words, the controller 8 works out if there is a landing 20 located beyond the current emergency stopping distance E of the elevator car 10 and at a distance less than the distance D. If this is possible, the controller 8 sends a modified emergency stop signal 58 with instruction to stop the elevator car 10 at the landing 20. This means that if necessary, any passengers in the elevator car 10 can exit easily from the elevator car 10.

In some elevator systems 2, for example in tall buildings with a large number of landings 20 the elevator car 10 travels at a high speed during normal operation and the emergency stopping distance can be over 100 m. These are often referred to as high-speed elevators. In most circumstances it is not appropriate to carry out an emergency stop while the elevator car 10 is travelling at or near its maximum operational speed. Therefore, for such high-speed elevator cars 10, the determination step (160) may also include a check as to whether the elevator car 10 is travelling at or near maximum speed. If the elevator car 10 is travelling at or near its maximum speed, the controller 8 determines that is it not appropriate to carry out an emergency stop, and the elevator car 10 continues in accordance with its last instruction.

FIG. 7 shows a method 100 of operating an elevator safety system 40 according to another example, which includes the method steps as outlined above and shown in FIG. 4.

The method of FIG. 7 includes a modified step (step 145) of determining a direction of travel of the elevator car 10 relative to the open landing door 22 directly after a warning signal 52 is detected. In step 145, the controller 8 uses data from the sensor 14 and/or speed sensor 16 to determine whether the elevator car is traveling towards or away from the open landing door 22.

If the direction of travel is away from the open landing door, i.e. the elevator car 10 is moving away from the open landing door 22, then no further action is taken. If the direction of travel is towards the open landing door 22, i.e. the elevator car 10 is moving towards the open landing door 22, then the further method steps are followed.

The method of FIG. 7 includes an additional step 155 in which the controller 8 performs a check on the data from the landing door sensor 26 which detected an open landing door 22. If the landing door 22 is still open, the evaluation as to whether to carry out an emergency stop (step 160) is carried out. If the landing door sensor 26 indicates that the landing door 22 is now closed, no such evaluation is carried out. The check of the landing door sensor 26 can be carried out at a predetermined time after receipt of the warning signal 52.

By checking on the landing door 22 after receipt of a warning signal 52, false detection of an open landing door 22 can be identified, for example in a situation where a landing door sensor 26 is faulty and therefore provides a warning signal 52 in error, or if a landing door opening mechanism 24 is worn or damaged such that it partially opens and recloses without the respective landing door 22 actually being opened. This means that the elevator safety system 40 is prevented from carrying out an emergency stop unnecessarily when there is no open landing door 22.

In a further example (not shown in the figures), the elevator car 10 is provided with a passenger detection sensor configured to determine whether passengers are present in the elevator car 10. The data from the passenger detection sensor is transmitted to the controller 8, and used in the determination of whether to carry out an emergency stop. For example, if the elevator car 10 is empty, the controller 8 carries out the determination as outlined above but with an empty elevator car 10 emergency stopping distance, which is shorter since no consideration has to be made for the comfort and safety of passengers.

In a further example, the elevator safety system 40 is able to operate in a maintenance mode which gives a maintenance engineer the necessary access to move the elevator car 10 at a low speed into a position in order to complete a required task, such as allowing access to a top or a bottom of the elevator car 10. The maintenance engineer may control the elevator car 10 with the control panel 28, or with a maintenance control unit, for example a control unit provided on top of the elevator car, or within the hoistway 2, or a mobile user interface carried by the maintenance engineer (e.g. smart phone or tablet). In this situation, the elevator safety system 40 may be configured to operate differently to its normal operation.

In one example, in the maintenance mode, the elevator safety system 40 may continue to monitor for warning signals 52 but the controller 8 is configured to react differently. FIG. 8 shows an example of a method 200 for operating an elevator safety system in a maintenance mode.

During normal operation the elevator safety system 40 operates as outlined above. In step 220, a maintenance mode can be activated by the maintenance engineer. Alternatively, the elevator safety system 40 can detect that the elevator car 10 is being moved slowly into a known, predefined maintenance location, for example with the top of the elevator car 10 aligned with the landing door 22.

When the elevator car 10 is travelling relatively slowly, this indicates that the elevator car 10 has just started from the landing 20 where the maintenance engineer stands. The elevator car 10 does not need to travel a long distance, i.e. less than the height of the elevator car, so should travel slowly. When the elevator car 10 is in position, the maintenance engineer opens the landing door 22 with a special key to get access, for example to the roof of the elevator car 10.

Whilst operating in the maintenance mode, in step 230 the landing door sensors 26 constantly monitor the state of respective landing doors 22. When a landing door sensor 26 detects that a landing door 22 close to the elevator car 22 is open, it outputs the warning signal 52, indicating the open landing door 22 and its location. In step 240, the controller 8 determines a current speed of the elevator car 10. In step 250, the current speed of the elevator car 10 is compared to a predetermined maintenance limit M. If the elevator car 10 is moving below the predetermined maintenance limit M, it is appropriate to stop the elevator car 10, and the emergency stop is activated (step 270).

If the elevator car 10 is moving at a speed above the predetermined maintenance limit M, the elevator car 10 cannot safely be stopped and so the elevator car 10 is moved to the next landing 20 (step 270). In other words, if the current speed exceeds the predetermined maintenance limit M, the elevator car 10 would not be able to stop in time to provide a safe access, for example to the roof of the elevator car 10, so it is more appropriate to keep the elevator car 10 moving to the next landing 20.

It will also be appreciated that the maintenance mode may further comprise monitoring for other open landing doors in the hoistway, i.e. open landing doors located remote from the maintenance engineer's location.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. An elevator safety system (40) comprising:

a plurality of landing door sensors (26), each landing door sensor (26) being configured to provide a warning signal (52) when a respective landing door (22) is open;

at least one sensor (14) configured to determine a current position of an elevator car (10) moving within a hoistway (2);

an elevator brake (7) configured to halt the motion of the elevator car (10);

a controller (8) configured to send an emergency stop signal (58) to the elevator brake (7);

wherein the controller (8) is configured to determine whether to send the emergency stop signal (58) based on: a direction of travel of the elevator car with respect to the open landing door; a current speed of the elevator car (10); and a distance (D) between the open landing door (22) and the current position of the elevator car (10);

wherein the controller (8) is configured to:

check the data from the landing door sensor (26) at a predetermined time after receipt of the warning signal (52), and send the emergency stop signal (58) only if the landing door (22) is still open.

2. The elevator safety system (40) of claim 1, wherein the at least one sensor (14) is a position sensor and the controller (8) is configured to determine the current speed of qthe elevator car (10) by differentiating data from the position sensor (14).

3. The elevator safety system (40) of claim 1, further comprising a second sensor (16) configured to determine the current speed of the elevator car (10).

4. The elevator safety system (40) of claim 1, wherein the controller (8) is configured to determine whether the elevator car (10) is travelling towards or away from the open landing door.

5. The elevator safety system (40) of claim 1, wherein the controller (8) is configured to:

determine to send the emergency stop signal (58) when the elevator car (10) is moving towards the open landing door (22) and the elevator car (10) can be safely stopped before or at the open landing door (22).

6. The elevator safety system (40) of claim 1, the controller (8) is further configured to:

determine that maintenance is being carried out on the elevator car (10);

determine that a landing door (22) close to the elevator car (10) is open;

send an emergency stop signal (58) when the current speed of the elevator car (10) is below a predetermined maintenance limit (M), and determine not to send the emergency stop signal (58) when the current speed of the elevator car (10) exceeds the predetermined maintenance limit (M).

7. An elevator system (1) comprising:

a hoistway (2) extending between a plurality of landings (20) each having at least one landing door (22);

an elevator car (10) configured for moving along the hoistway (2) between the plurality of landings (20); and an elevator safety system (40) according to claim 1.

8. A method (100) for operating an elevator safety system (40) comprising:

monitoring a current position of an elevator car (10) moving within a hoistway (2);

detecting an open landing door (22) within the hoistway (2);

determining the distance (D) between the current position of the elevator car (10) and the open landing door (22);

determining whether to send an emergency stop signal (58) based on: a direction of travel of the elevator car with respect to the open landing door a current speed of the elevator car (10) and the distance (D) between the open landing door (22) and the current position of the elevator car (10);

the method further comprising:

checking the data from a landing door sensor (26) at a predetermined time after receipt of a warning signal (52), and sending the emergency stop signal (58) only if the landing door (22) is still open.

9. The method according to claim 8, further comprising a step of determining the current speed of the elevator car (10) by differentiating the data relating to the current position of the elevator car (10).

10. The method according to claim 8, further comprising receiving the current speed from a second sensor (16) provided on the elevator car (10).

11. The method according to claim 8, further comprising:

determining if the elevator car (10) is travelling towards or away from the open landing door (22).

12. The method according to claim 8, further comprising:

determining to send the emergency stop signal (58) when the elevator car (10) is moving towards the open landing door (22) and the elevator car (10) can be safely stopped before or at the open landing door (22).

13. The method according to claim 8, further comprising:

receiving an input indicating that maintenance is being carried out;

determining that a landing door (22) close to the elevator car (10) is open;

sending an emergency stop signal (58) when the current speed of the elevator car (10) is below a predetermined maintenance limit (M), and determining not to send the emergency stop signal (58) when the current speed of the elevator car (10) exceeds a predetermined maintenance limit (M).

* * * * *